S. VAN SYCKEL.
OIL-STILL.

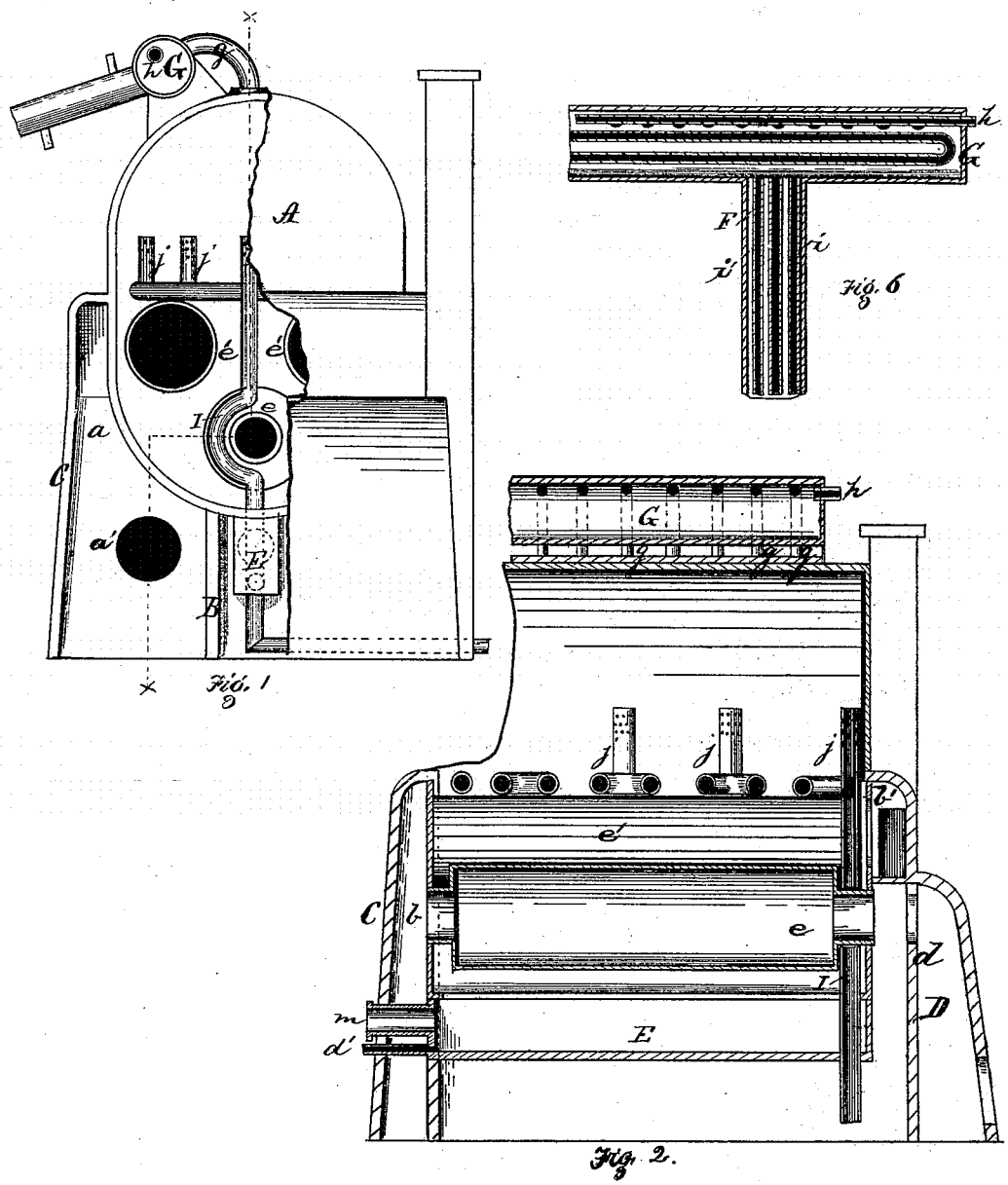

No. 191,204.   Patented May 22, 1877.

Witnesses
R. C. _____
J. K. Smith

Inventor
Sam'l Van Syckel
by Bakewell & Kerr
Attys.

ature and disturbance of the oil in the
UNITED STATES PATENT OFFICE.

SAMUEL VAN SYCKEL, OF TITUSVILLE, PENNSYLVANIA.

IMPROVEMENT IN OIL-STILLS.

Specification forming part of Letters Patent No. 191,204, dated May 22, 1877; application filed February 12, 1877.

*To all whom it may concern:*

Be it known that I, SAMUEL VAN SYCKEL, of Titusville, in the county of Crawford and State of Pennsylvania, have invented a new and useful Improvement in Stills; and I do hereby declare the following to be a full, clear, and exact description thereof, reference being had to the accompanying drawing, forming part of this specification, in which—

Figure 3:
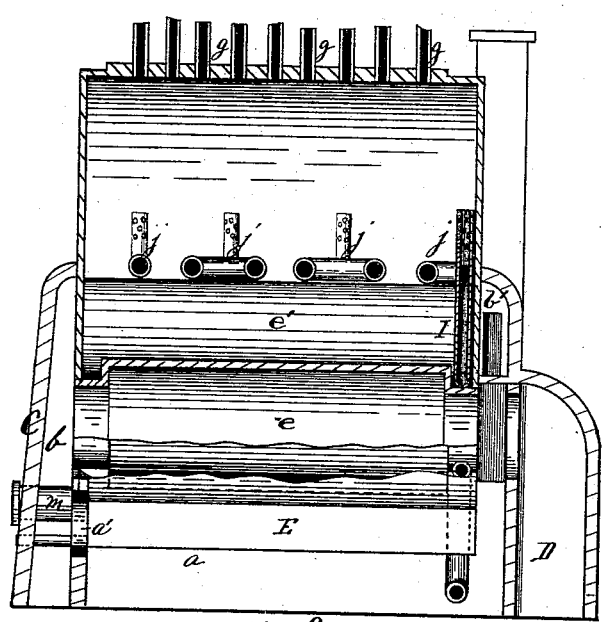
Figure 5:
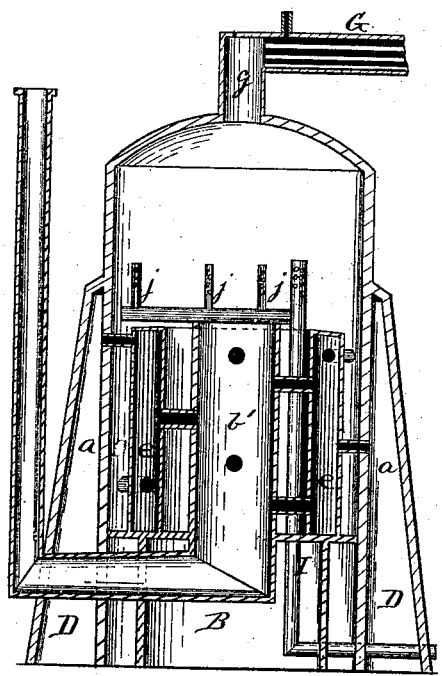
Figure 4:
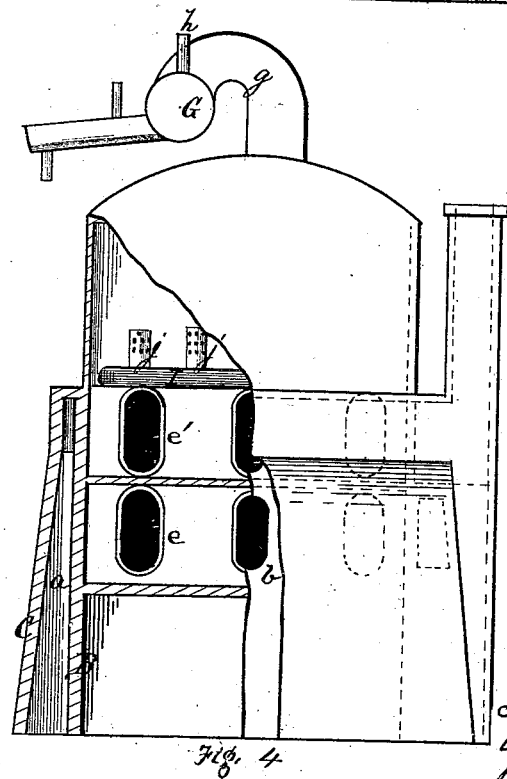

Figure 1 is an elevation, partly in section, of a horizontal cylindrical still embodying my invention. Fig. 2 is a vertical longitudinal section. Fig. 3 is a similar section on the line $x\ x$, Fig. 1. Fig. 4 is an elevation, partly in section, of a square still embodying my invention. Fig. 5 is a vertical section of a "cheese-box" still or a vertical cylindrical still; and Fig. 6 is a horizontal section of the condenser-head of the stills.

Like letters refer to like parts wherever they occur.

The same principle of construction applies to each of the several stills, and for purposes of illustration I have selected to show my improvements as applied to the forms of stills in most common use.

My invention relates to the construction of stills in general; but is especially designed for oil-stills, where it is desirable to heat a body of oil uniformly throughout, so as to be able to conduct distillation with moderate heat, thus avoiding burning or carbonizing of the oil.

My invention consists, first, in constructing and setting the still so that a series of flues traverse and surround the oil, dividing it into thin portions or strata, to both sides of which the heat is applied evenly, whereby the high temperatures necessary where the body of the oil transmits the heat is avoided; and, secondly, in a series of supply-pipes, which pass through the oil in the still, and deliver the incoming oil just below the surface of the oil in the still, the vapor formed escaping by branch-pipes above the surface of the oil, whereby the oil is heated to, or nearly to, the temperature of the oil in the still, and any contained vapors or gases are allowed to escape, thus avoiding the reduction of the temperature and disturbance of the oil in the still, whereby the distillation is permitted to proceed uninterruptedly and at uniform temperatures.

Heretofore, as commonly constructed, the fires have been allowed to play directly upon the under surface of the still, high temperatures were necessary to heat the body of oil properly, and the whole body of oil, in addition to the disturbance due to disproportionate fire surface, was violently agitated from time to time by the admission of a body or supply of oil at a much lower temperature than the still-oil. Furthermore, the application of the heat to so small a surface rendered it necessary to force the fires to such an extent that the portions of the oil which came in immediate contact with the fire-surface were decomposed, forming tar and gas, and resulting in considerable loss in quantity and injury to the quality of the product.

The object of the present invention is therefore, first, to increase the heating-surface, so that distillation may proceed at a low temperature without undue agitation of the contents of the still; and, secondly, to avoid any agitation of the oil in supplying the still.

I will now proceed to describe my invention, so that others skilled in the art to which it appertains may apply the same.

In the drawing, A represents the still supported upon suitable masonry B, and walled in by walls C, which extend to the level of the oil in the still. D represents the furnaces or combustion chamber separated from direct contact with the still by a perforated bridge-wall, $d$. The walls C are so built up as to form, with the still, a series of side flues, $a\ a$, and end flues $b\ b'$, the side flues $a\ a$ and flue $b$ being connected by openings $a'$, which may be guarded by dampers. Within the body of the still, and dividing up the same, are a series of flues, $e\ e'$, which connect with the end flues, those marked $e$ receiving the products of combustion through or over bridge-wall $d$, and delivering them into $b$, while those marked $e'$, or return flues, gather the products of combustion from $b$ and deliver them into $b'$, which communicates with the stack. In the square still these flues $e\ e'$ may be of uniform diameter throughout, and connected by small cross-flues, if desired; but in the horizontal cylinder the best form to adopt for the flue e is that of a large drum, having narrow or constricted outlets. The cross-flues also serve as braces or stays, supporting the main flues against the pressure of the oil in the still.

E is a sink or receptacle, corresponding to the mud-drum of a boiler, placed at the bottom of the still below the level of the flues, so as to be guarded against any considerable de-degree of heat, and is intended to receive any sediment, water, &c., which may be deposited from the contents of the still. It is usually provided with a man-hole, m, and from it, or contiguous thereto, comes off the draw-off or delivery pipe d' of the still. I indicates the inlet or supply pipe, which enters the still at or near its bottom, and passes up to a point just below the liquid level, where it branches horizontally, and is provided with a set of jet or spray tubes, j, that deliver the vapor from the incoming oil into the vapor-chamber or dome of the still, while the oil which has acquired the temperature of the oil in the still is delivered quietly and evenly into the still-oil just below the surface.

From the dome of the still the goose-neck, which may be single or a series of pipes, g, conducts the vapors to a vapor-cylinder, G, traversed by a set of tubes, h, which carry water and form a preliminary condenser, which is located directly on the dome, as shown. From this cylinder G the vapors are collected by the pipes i, which are surrounded by a water-jacket, F, and are conducted to the usual or any approved condenser suitably placed.

In the cheese-box still, Fig. 5, the flues, though identical in their relation to the still, and in their function, are somewhat modified in form—as, for instance, the flue e is a vertical annular cylinder connecting with flue a by a series of short tubes, and with flue b' by a second series of short tubes intermediate to the tubes which connect a and e.

The operation of these devices is as follows: A regulated and predetermined quantity of oil being admitted to the still, and provision made for maintaining the supply, (which can be done by means of a governor similar to the one described in an application of even date herewith,) the fire is started in the furnace, and the heat of the still brought to the requisite degree, (which will be determined by the character of the oil in the still,) when the contents of the still will be evenly and uniformly heated by the products of combustion in their passage through the flues a a and e e', the oil being divided up by the flues and subjected to heat on all sides. The gradually incoming oil will rise slowly through supply-pipe I, becoming thoroughly heated by the time it reaches the discharge-tubes j, where it escapes, the vapors which may have been generated rising into the dome, while the oil already of the same temperature of the still-oil mingles therewith without any disarrangement of the operations of the still. The vapors generated escape by the gooseneck into the preliminary condenser G, (from whence any easily-condensed product can return to the still.)

The advantages of my devices are that I am enabled by their use to carry on distillation regularly and satisfactorily at low temperatures and steady heats, which gives brighter and better oils and results in a much larger yield. Less waste takes place in distilling high fire-test oils. The construction and arrangement of the flues gives sufficient room to admit of the ready cleaning of the still, which is an important advantage over flue-stills as now generally constructed.

A still constructed in accordance with my invention will perform from three to five times the labor of stills as ordinarily constructed. A twenty-five barrel still that formerly made fifteen barrels refined oil per day, when altered as above described made seventy-five barrels refined oil per day, and was cleaned but once in two weeks, while under the old process the same still had to be cleaned every day.

Having thus described my invention, what I claim, and desire to secure by Letters Patent, is—

1. An oil or similar still having a series of traversing-flues, e e', and surrounding flues a b b', which extend to the height of the oil within the still, substantially as and for the purpose specified.

2. In combination with the still and its goose-neck, the preliminary condenser, arranged upon the still, substantially as and for the purpose specified.

3. In combination with an oil or similar still, having surrounding and traversing flues which extend to the height of the oil within the still, a supply-pipe which rises within the still from a point at or near the bottom of the still and delivers just below the liquid-level, and having branch pipes for the escape of the vapor, substantially as and for the purpose specified.

In testimony whereof I, the said SAMUEL VAN SYCKEL, have hereunto set my hand.

SAMUEL VAN SYCKEL.

Witnesses:
 JAMES I. KAY,
 F. W. RITTER, Jr.